(12) United States Patent
Chen et al.

(10) Patent No.: US 12,355,342 B2
(45) Date of Patent: Jul. 8, 2025

(54) SWITCH-MODE CONVERTER, CONTROL METHOD FOR THE SAME, AND CONTROL CIRCUIT FOR THE SAME

(71) Applicant: Silergy Semiconductor Technology (Hangzhou) LTD, Hangzhou (CN)

(72) Inventors: Zhan Chen, Hangzhou (CN); Qiukai Huang, Hangzhou (CN); Jin Jin, Hangzhou (CN); Guiying Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 363 days.

(21) Appl. No.: 17/965,938

(22) Filed: Oct. 14, 2022

(65) Prior Publication Data

US 2023/0119541 A1    Apr. 20, 2023

(30) Foreign Application Priority Data

Oct. 15, 2021 (CN) .......................... 202111205518.5

(51) Int. Cl.
| | |
|---|---|
| *H02M 1/32* | (2007.01) |
| *H02M 1/00* | (2006.01) |
| *H02M 1/08* | (2006.01) |
| *H02M 3/335* | (2006.01) |
| *H02M 7/06* | (2006.01) |

(52) U.S. Cl.
CPC ........... *H02M 1/32* (2013.01); *H02M 1/0009* (2021.05); *H02M 1/08* (2013.01); *H02M 3/33515* (2013.01); *H02M 7/06* (2013.01); *H02M 3/33523* (2013.01)

(58) Field of Classification Search
CPC ........ H02M 1/32; H02M 1/0009; H02M 1/08; H02M 3/33515; H02M 7/06; H02M 3/33523

See application file for complete search history.

(56) References Cited

U.S. PATENT DOCUMENTS

| | | |
|---|---|---|
| 7,227,277 B2 | 6/2007 | Chapman et al. |
| 7,256,568 B2 | 8/2007 | Lam et al. |
| 8,310,846 B2 | 11/2012 | Piazzesi |
| 8,853,888 B2 | 10/2014 | Khaligh |
| 9,130,460 B2 | 9/2015 | Sun et al. |
| 9,257,916 B2 | 2/2016 | Cheng et al. |
| 9,543,822 B2 | 1/2017 | Hang et al. |
| 9,559,591 B2 | 1/2017 | Hang et al. |
| 9,825,540 B2 * | 11/2017 | Yabuzaki ................. H02M 1/32 |
| 2006/0290333 A1 * | 12/2006 | Fukushi .................. H02M 1/32 323/277 |
| 2007/0052397 A1 | 3/2007 | Thompson et al. |
| 2008/0231115 A1 | 9/2008 | Cho et al. |
| 2008/0258688 A1 | 10/2008 | Hussain et al. |

(Continued)

*Primary Examiner* — Kyle J Moody

(57) ABSTRACT

A method of controlling a switch-mode converter can include: obtaining an overcurrent reference threshold according to an output voltage sampling signal indicative of an output voltage of the switch-mode converter; and generating an over current protection triggering signal in response to an output current sampling signal indicative of an output current of the switch-mode converter and the overcurrent reference threshold meet a predetermined criterion, thereby triggering the switch-mode converter to enter a protection state.

18 Claims, 12 Drawing Sheets

(56) References Cited

U.S. PATENT DOCUMENTS

| | | |
|---|---|---|
| 2012/0147630 A1* | 6/2012 | Cao .................. H02M 3/33507 |
| | | 363/21.15 |
| 2012/0153729 A1 | 6/2012 | Song et al. |
| 2013/0063180 A1 | 3/2013 | Sun et al. |
| 2015/0078045 A1 | 3/2015 | Zhang et al. |
| 2016/0211745 A1 | 7/2016 | Hang et al. |
| 2017/0063238 A1 | 3/2017 | Hang et al. |
| 2017/0279279 A1 | 9/2017 | Shimada et al. |
| 2018/0198361 A1 | 7/2018 | Seong et al. |
| 2021/0167684 A1* | 6/2021 | Matsumoto ............. H02M 1/32 |

* cited by examiner

SWITCH-MODE CONVERTER, CONTROL METHOD FOR THE SAME, AND CONTROL CIRCUIT FOR THE SAME

RELATED APPLICATIONS

This application claims the benefit of Chinese Patent Application No. 202111205518.5, filed on Oct. 15, 2021, which is incorporated herein by reference in its entirety.

FIELD OF THE INVENTION

The present invention generally relates to the field of power electronics, and more particularly to switch-mode converters and associated control methods and circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Switch-mode converters operating under different output voltages have to meet limited power source (LPS) requirements in order to reduce safety risks. LPS specifies output voltage, output current, and output power of switch-mode converters. An overcurrent protection circuit is provided in the switch-mode converter to protect a converter-dependent circuit against damage caused by overly high output current (e.g., overcurrent) or overly high output power. For example, the switch-mode converter is controlled to be turned off as soon as the output current exceeds a certain value, in order to reduce safety risks. Some overcurrent protection methods may fail to meet LPS requirements and overcurrent protection needs simultaneously, as the overcurrent protection point may be large and exceed the limitation placed by LPS on an output current in the presence of a low output voltage.

Figure 1:
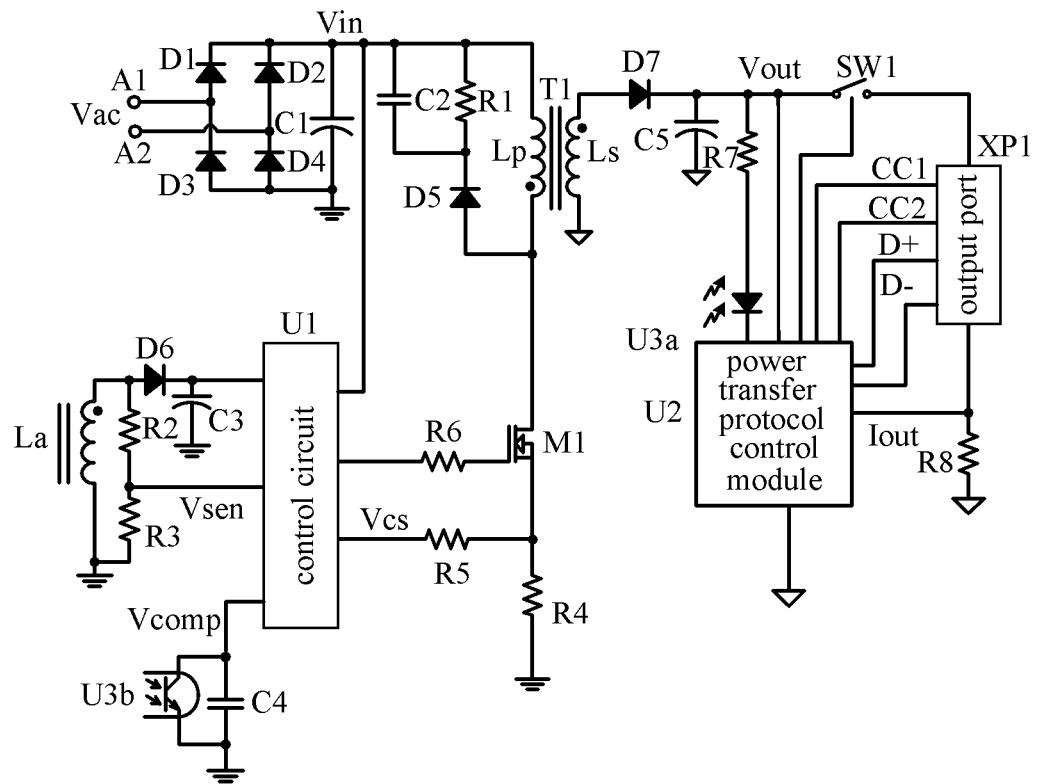
FIG. 1 is a schematic block diagram of a switch-mode converter, in accordance with embodiments of the present invention.

Referring now to FIG. 1, shown is a schematic block diagram of a switch-mode converter, in accordance with embodiments of the present invention. In this particular example, the switch-mode converter is an isolated switch-mode converter and can include a primary-side circuit and a secondary-side circuit. The primary-side circuit and the secondary-side circuit are connected by transformer T1. Transformer T1 transforms electrical signals output from the primary-side circuit and then outputs the electrical signals to the secondary-side circuit. Transformer T1 can include primary winding Lp for the primary-side circuit and secondary winding Ls for the secondary-side circuit.

The primary-side circuit can perform rectification and filtration on received external AC electrical signal Vac to obtain DC signal Vin. DC signal Vin can be output to the secondary-side circuit through transformer T1 (primary winding Lp and a secondary winding are coupled together). Then, the secondary-side circuit may perform rectification and filtration on the received electrical signals to obtain output voltage Vout, and then provide output voltage Vout through output port XP1.

The primary-side circuit can include a power stage circuit, an auxiliary voltage sampling circuit, a primary current sampling circuit, control circuit U1, and related circuits. The power stage circuit can include input ends $A_1$ and $A_2$, a primary rectification circuit, primary winding Lp, and power switch M1. Input ends $A_1$ and $A_2$ receive external electrical signal Vac. The external electrical signal can be an AC electrical signal, e.g., 220V or 380V AC utility power or any other AC electrical signals. The external electrical signal can be received by connecting input ends A1 and A2 directly to an external power source interface through a plug, or by input ends A1 and A2 wirelessly.

The primary rectification circuit can connect to the input ends $A_1$ and $A_2$ and adapted to rectify the external electrical signal Vac. In the example of FIG. 1, the primary rectification circuit is a full-bridge rectification circuit comprising diodes D1, D2, D3, and D4. A rectification circuit with any other structure, such as half-bridge rectification, is also applicable in certain embodiments. The rectification circuit may also operate by synchronous rectification to rectify the external electrical signals with controlled switches.

The primary-side circuit can also include capacitor C1 connected to the output ends of the primary rectification circuit and adapted to filter electrical signals output from the primary rectification circuit. After undergoing rectification and filtration, external electrical signal Vac may result in signal Vin. Power switch M1 and primary winding Lp can be series-connected between the output end and the ground end of the primary rectification circuit. Power switch M1 can be controlled to turned on and turned off, in order to control the output current and/or output voltage of primary winding Lp.

In particular embodiments, power switch M1 is transistor Qa, such as a metal-oxide-semiconductor field-effect transistor (MOSFET). In addition, a bipolar-junction transistor (BJT) or an insulated-gate bipolar transistor (IGBT) may also be applicable in certain embodiments. The primary-side circuit can also include capacitor C2, resistor R1, and diode D5. Capacitor C2 and resistor R1 may together form a parallel-connected circuit. The parallel-connected circuit and diode D5 can be series-connected to form a series-connected circuit. The series-connected circuit can connect to two ends of the primary winding Lp to form an RCD buffer circuit for absorbing leakage inductance energy and avoiding a voltage peak.

In particular embodiment, the power stage circuit can be replaced by any power converters with any other structures, such as a switch-mode converter having boost topology, buck topology or buck-boost topology, as long as the duty ratio of the power switch of the switch-mode converter is controlled or the magnitude of output current and/or voltage is regulated according to switching frequency. The auxiliary voltage sampling circuit can obtain an auxiliary voltage sampling signal. The auxiliary voltage sampling signal is indicative of the voltage across the two ends of an auxiliary winding La. The voltage across the two ends of the auxiliary winding can also be used to supply electric power to any other circuits after the circuit has started.

The auxiliary voltage sampling circuit can also include resistors R2 and R3. Resistors R2 and R3 can be series-connected to the two ends of the auxiliary winding to constitute a voltage division network, in order to output an auxiliary voltage sampling signal Vsen at the connection point of resistors R2 and R3. The primary current sampling circuit may obtain primary current sampling signal Vcs and can include resistor R4 connected between power switch M1 and the ground end to obtain primary current sampling signal Vcs, which may be transmitted to the control circuit through resistor R5. Primary current sampling signal Vcs is indicative of a primary current Ia flowing through the primary winding Lp.

Control circuit U1 may generate a switch control signal for controlling the switching frequency and duty ratio of power switch M1, thereby controlling the output current and/or output voltage of the switch-mode converter. The control circuit an also control power switch M1 to be turned off when the overcurrent of the output current of the switch-mode converter is detected, thereby preventing the switch-mode converter from outputting electrical signals. In particular embodiments, the secondary-side circuit can include a secondary winding Ls, secondary rectification circuit, secondary filter circuit, power transfer protocol control module U2, and related circuits.

Secondary winding Ls can be coupled to the primary winding Lp to receive electrical signals transmitted by the primary winding. The secondary rectification circuit can rectify the electrical signals output from secondary winding Ls. In this particular example, the secondary rectification circuit is diode D7 and thereby performs half-wave rectification. In particular embodiments, any rectification circuits with any other structures (e.g., bridge rectification or full-wave rectification) are also applicable. While diode rectification is exemplified, the rectification circuit may also operate by synchronous rectification to rectify the external electrical signals with controlled switches.

The secondary filter circuit may filter the electrical signals output from the secondary rectification circuit. As shown in FIG. 1, filtration can be carried out with a capacitor C5. The secondary-side circuit can also include optical coupler equipment (OCEP) U3a, U3b for feeding back a compensation signal Vcomp from the secondary-side circuit to the primary-side circuit, such that control circuit U1 controls the duty ratio and/or switching frequency of power switch M1 according to the compensation signal to allow the output current and output voltage of the switch-mode converter to satisfy a selected current parameter and voltage parameter.

In certain embodiments, the secondary-side circuit can also include load switch SW1 connected between the output port XP1 and the secondary rectification circuit and that can be controlled to be turned on or turned off. When load switch SW1 is turned on, output voltage Vout can charge a connected charging apparatus through the output port XP1. When load switch SW1 is turned off, output port XP1 may not output electrical signals.

Power transfer (PD) protocol control module U2 can communicate with the connected charging apparatus through output port XP1. In certain embodiments, output port XP1 is a USB type-C interface. FIG. 1 shows only four pins CC1, CC2, D+ and D− of output port XP1. Only after the PD protocol handshaking succeeds, an apparatus connected to output port XP1 can transmit data, for example, upgrading voltage and current levels. Thus, when output port XP1 of the switch-mode converter connects to the charging apparatus, the charging apparatus may query a register inside power transfer protocol control module U2 through output port XP1 to determine an output voltage and an output current allowed by the switch-mode converter, then can select voltage parameters and current parameters, and inform the power transfer protocol control module U2 of the voltage parameter, and the current parameter.

Power transfer protocol control module U2 can detect output current Iout and output voltage Vout in real time, and may turn off load switch SW1 as soon as the output power or output current exceeds a limit threshold. For example, a maximum output voltage ranging can be 3.3V to 21V, a maximum output power may not exceed 100W, and an output current may not exceed 8 A. In one example, the sampling of the output current Iout can be achieved with resistor R8 connected between output port XP1 and the ground end.

Figure 2:
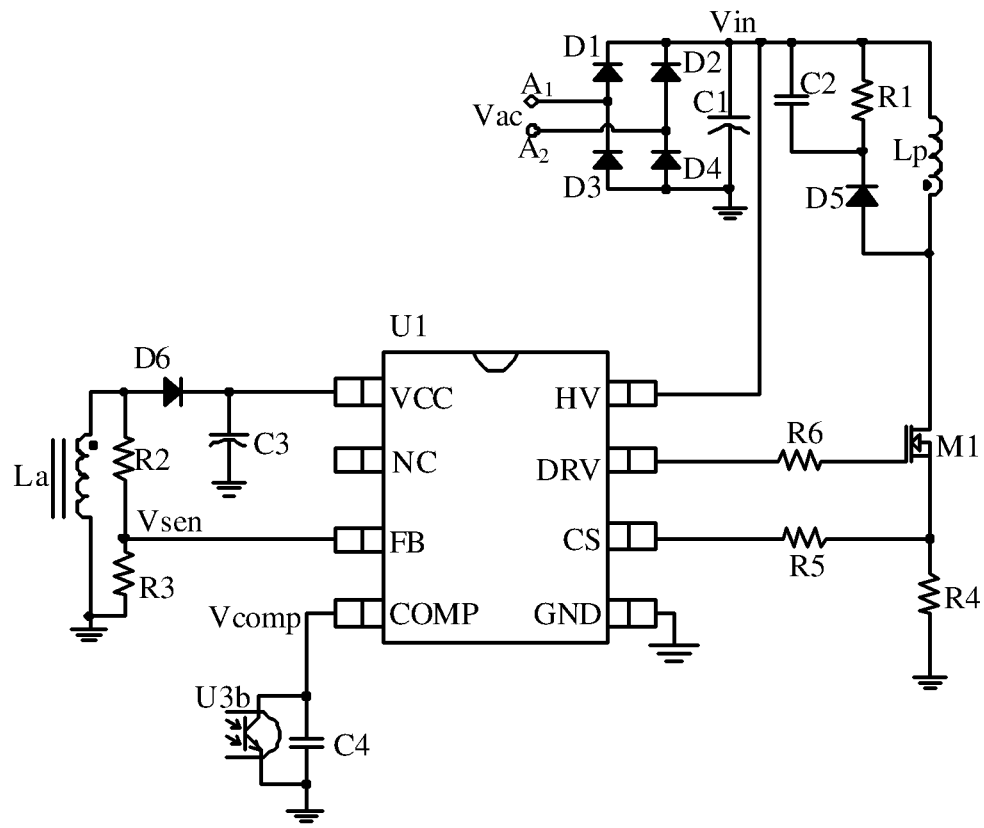
FIG. 2 is a schematic block diagram of the switch-mode converter, in accordance with embodiments of the present invention.

Referring now to FIG. 2, shown is a schematic block diagram of the switch-mode converter, in accordance with embodiments of the present invention. FIG. 2 shows only the pins of control circuit U1 and circuits connected to the pins. In this particular example, control circuit U1 can include eight pins, as described below. Pin VCC may receive a power supplying voltage. After the voltage across the two ends of auxiliary winding La is rectified and filtered by diode D6 and capacitor C3, it can be output to pin VCC of control circuit U1, in order to supply power to control circuit U1. Pin NC is a not connected (NC) pin provided for packaging requirements.

Pin FB may receive auxiliary voltage sampling signal Vsen. Auxiliary voltage sampling signal Vsen can be indicative of the voltage across the two ends of the secondary winding. Pin COMP can connect to optical coupler equipment U3. Compensation signal Vcomp output from optical coupler equipment U3 may be filtered by capacitor C4 and then output to pin COMP of control circuit U1. Pin HV can connect to the output end of the primary rectification circuit for receiving the output voltage of the primary rectification circuit, in order to use the voltage as a start voltage. After pin HV has received the start voltage, control circuit U1 starts, thereby allowing pin VCC to supply power to control circuit U1.

Pin DRV can connect to power switch M1 for outputting the switch control signal, to control the duty ratio and/or switching frequency of power switch M1, so that the output current and output voltage of the switch-mode converter satisfy the selected current parameters and voltage parameters. Pin CS can connect to the primary current sampling circuit to receive the primary current sampling signal Vcs. Pin GND is grounded.

Figure 3:
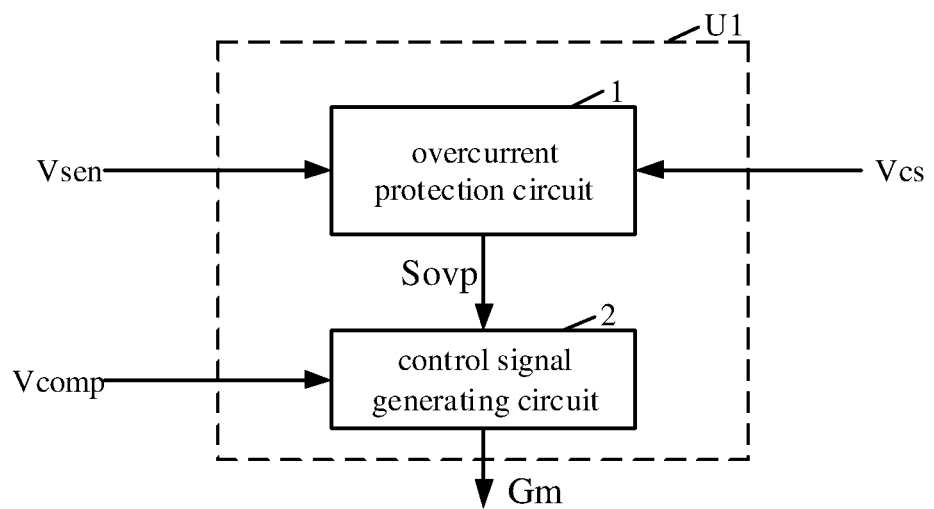
FIG. 3 is a schematic block diagram of a control circuit, in accordance with embodiments of the present invention.

Referring now to FIG. 3, shown is a schematic view of a control circuit in accordance with embodiments of the present invention. In this particular example, control circuit U1 can include overcurrent protection circuit 1 and control signal generating circuit 2. Overcurrent protection circuit 1 may obtain an overcurrent reference threshold value according to an output voltage sampling signal characterizing the output voltage of the switching converter, and can generate an overcurrent protection trigger signal Sovp in response to the output current sampling signal characterizing the output current of the switching converter and the overcurrent reference threshold meeting a predetermined criterion. Control signal generating circuit 2 can control the switching converter to enter a protection state in response to receiving an active overcurrent protection trigger signal Sovp. Here, the predetermined criterion can be set according to the application of control circuit U1, in order to provide the overcurrent protection and control the switching converter to enter a protection state when the overcurrent occurs.

Figure 6:
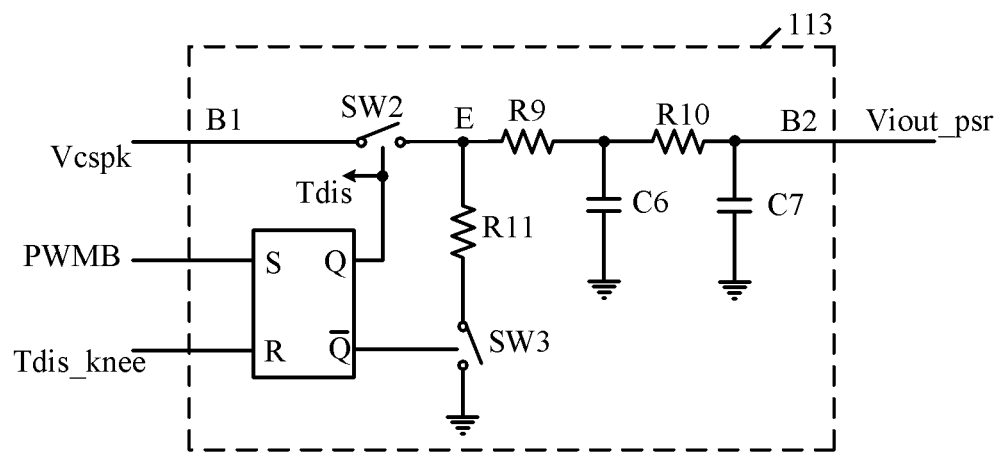
FIG. 6 is a schematic block diagram of a current determining circuit, in accordance with embodiments of the present invention.
Figure 7:
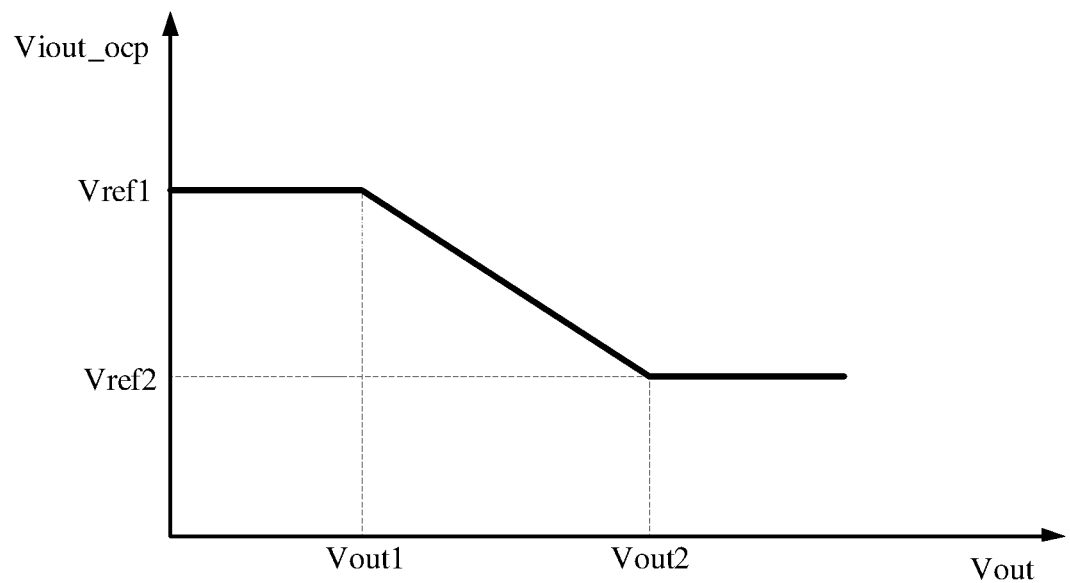
FIG. 7 is a schematic view of an example overcurrent protection curve, in accordance with embodiments of the present invention.
Figure 8:
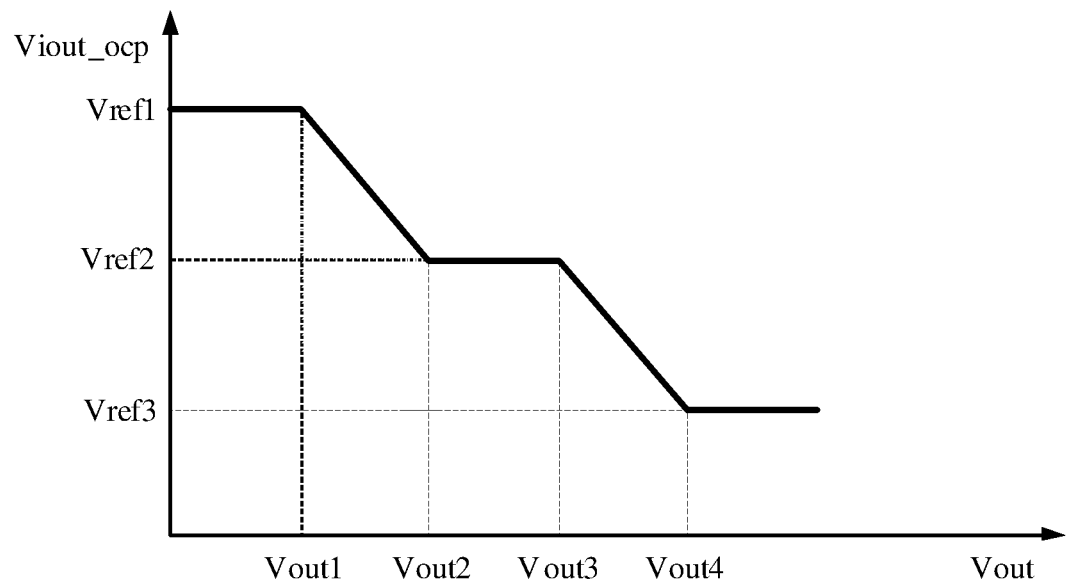
FIG. 8 is a schematic view of another example overcurrent protection curve, in accordance with embodiments of the present invention.

When the switch-mode converter does not have any overcurrent, the overcurrent protection circuit 1 may not output any overcurrent protection triggering signal, or an output overcurrent protection triggering signal Sovp is an inactive signal. Here, control signal generating circuit 2 can be controlled by compensation signal Vcomp only and may generate switch control signal Gm, in order to regulate the output voltage and/or output current of the switch-mode converter. When overcurrent protection circuit 1 detects that an overcurrent of the switch-mode converter occurs, output overcurrent protection triggering signal Sovp is an active signal, such that control signal generating circuit 2 does not output the control signal Gm or power switch M1 is turned off by output control signal Gm. Example corresponding relationships between the output voltage of the switching converter and the overcurrent reference threshold are shown in FIGS. 6, 7, and 8.

The output voltage sampling signal can be obtained by sampling the output voltage of the switching converter, and the output current sampling signal can be obtained by sampling the output current of the switching converter. In particular embodiments, the switching converter can be an isolated switching converter, as shown in FIG. 1. Overcurrent protection circuit 1 can obtain the output voltage sampling signal according to auxiliary voltage sampling signal Vsen, where the auxiliary voltage sampling signal is obtained by sampling a voltage at two terminals of auxiliary winding La coupled to the primary winding Lp of the transformer in the isolated switching converter. Further, overcurrent protection circuit 1 can obtain the output current sampling signal according to auxiliary voltage sampling signal Vsen and a primary current sampling signal, and the primary current sampling signal may represent the current flowing through primary winding Lp. In particular embodiments, control signal generating circuit 2 may receive the compensation signal Vcomp. The compensation signal can be transmitted from the secondary-side circuit to control signal generating circuit 2 through the optical coupler equipment.

In particular embodiments, compensation signal Vcomp may be indicative of the difference between output voltage Vout and the expected voltage. The expected voltage is the charging voltage obtained by power transfer protocol control module U2. Thus, the charging apparatus queries a register inside power transfer protocol control module U2 through output port XP1 to determine an output voltage allowed by the switch-mode converter, then select a voltage parameter, and inform power transfer protocol control module U2 of the output voltage and the voltage parameter. Thus, power transfer protocol control module U2 can obtain the expected voltage.

As shown in FIG. 1, power transfer protocol control module U2 can connect to the output end of the secondary-side circuit to obtain output voltage Vout. Thus, a difference signal between output voltage Vout and the expected voltage is obtained. Then, the difference signal is output to the negative terminal of a light-emitting diode in optical coupler U3a. The positive terminal of the light-emitting diode in optical coupler U3a can connect to the output end of the secondary-side circuit through resistor R7. Optical coupler U3a may generate compensation signal Vcomp according to the difference signal, and thus control signal generating circuit 2 can control the power switch to be turned on and turned off according to compensation signal Vcomp, thereby allowing output voltage Vout of the switch-mode converter to equal the expected voltage.

In the example of FIG. 3, for exemplary purposes, the control signal generating circuit 2 simultaneously achieves two functions, where the switch-mode converter operating in a normal working state controls the duty ratio and/or frequency of power switch M1, and the switch-mode converter operating in an overcurrent state is controlled to enter a protection state. In another example, control circuit U1 may have two control signal generating circuits, namely a first control signal generating circuit and a second control signal generating circuit. When the switch-mode converter operates in a normal working state, the first control signal generating circuit operates and controls the duty ratio and/or frequency of power switch M1, whereas the second control signal generating circuit does not operate. When the switch-mode converter is in an overcurrent state, the second control signal generating circuit operates and controls the switch-mode converter to enter a protection state, whereas the first control signal generating circuit does not operate.

Figure 4:
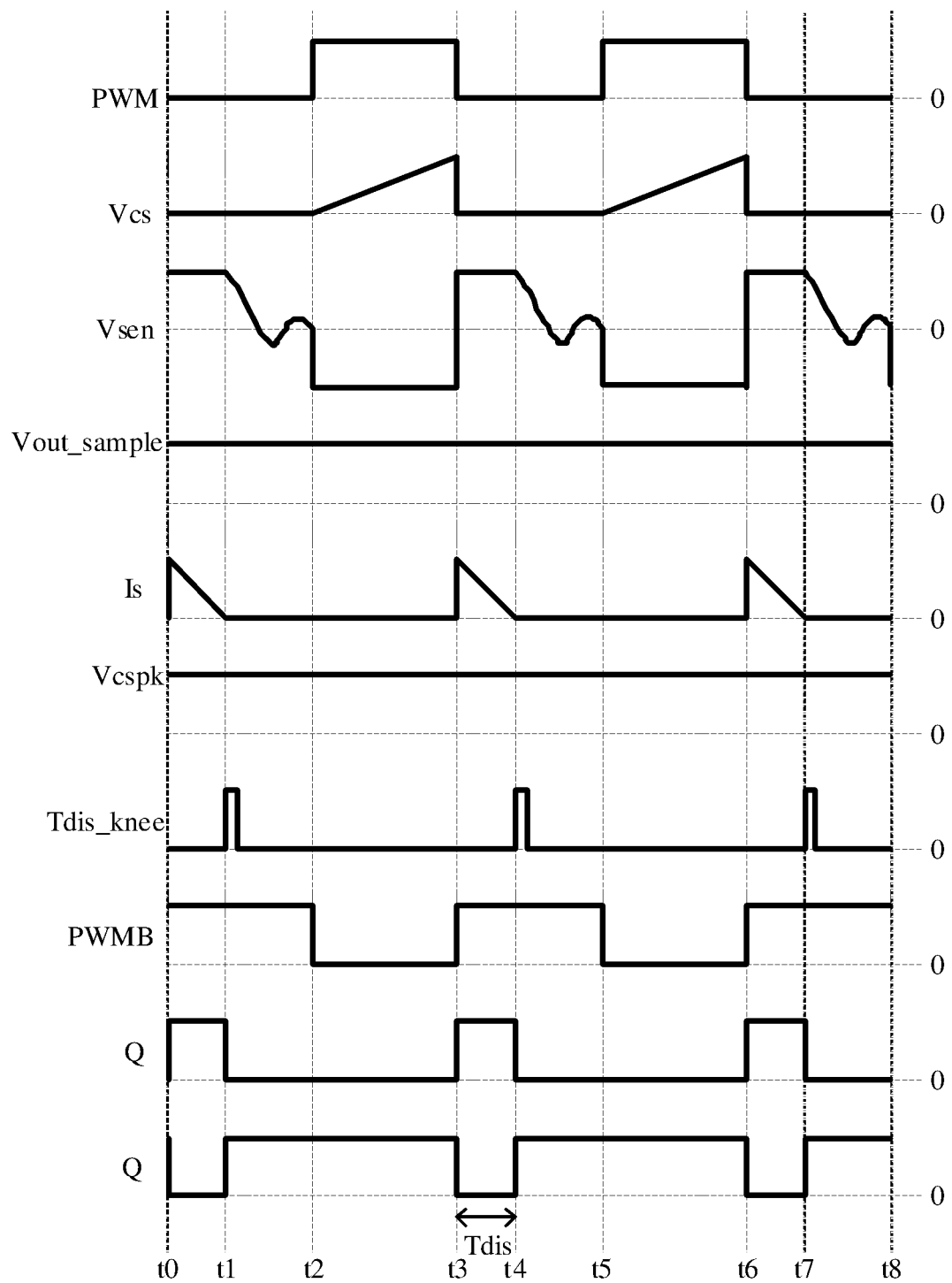
FIG. 4 is a signal waveform graph of the switch-mode converter, in accordance with embodiments of the present invention.

Referring now to FIG. 4, shown is a signal waveform graph of the switch-mode converter in accordance with embodiments of the present invention. This particular example may be applied to the isolated switching converter in FIG. 1, whereby a control signal of power switch M1 is a pulse-width modulation (PWM) signal. The output voltage and/or output current of the switch-mode converter can be controlled by controlling the duty ratio and/or frequency of the PWM signal. Thus, regulation of the output voltage and/or output current of the switch-mode converter can be achieved with the PWM signal, in order to provide an appropriate charging voltage and/or charging current to the connected charging apparatus.

One switching cycle is divided into three stages according to the working states of power switch M1 and the transformer T1. The switching cycle is exemplified by the t2-t5 time period and described below. In the first stage (t2-t3 time period), the PWM signal is at a high level, and power switch M1 is turned on, the current flowing through the primary winding Lp increases gradually, and the primary winding Lp is charged. Auxiliary voltage sampling signal Vsen is expressed by the equation below.

$$Vsen = \frac{R3}{R2+R3} * \frac{Na}{Ns} * Vout$$

Where Na denotes the number of turns of auxiliary winding La, Ns denotes the number of turns of secondary winding Ls, and Vout denotes the output voltage of the switch-mode converter. Na, Np, R2, R3 are fixed values. Thus, auxiliary voltage sampling signal Vsen is directly proportional to output voltage Vout. Therefore, during the t2-t3 time period, auxiliary voltage sampling signal Vsen may remain unchanged. The change trend of the primary current sampling signal Vcs can be consistent with the change trend of the current flowing through the primary winding; that is, both may increase gradually.

In the second stage (t3-t4 time period), demagnetization of transformer T1 can occur. At this point in time, the PWM signal is switched to a low level, and power switch M1 is turned off. Thus, primary winding Lp can transfer energy to secondary winding Ls, and the current flowing through secondary winding Ls decreases continuously until the current reaches 0 A. Auxiliary voltage sampling signal Vsen can be expressed by the equation below at this point.

$$Vsen = \frac{R3}{R2+R3} * \frac{Na}{Ns} * Vout$$

Here, Na denotes the number of turns of auxiliary winding La, and Ns denotes the number of turns of the secondary winding Lp. Ns, Na, R2 and R3 are fixed values. Therefore, auxiliary voltage sampling signal Vsen is directly proportional to output voltage Vout. When power switch M1 is turned off, the primary current sampling signal Vcs is zero. A secondary current Is of the secondary winding of transformer T1 can decrease gradually from the peak until it reaches 0 A. Since output current Tout of the switch-mode converter is the average value of the secondary current Is, the peak value of the secondary current Is can be inferred according to primary current sampling signal Vcs. Therefore, output current Tout can be calculated with demagnetization time Tdis (time t3 through time t4) of a transformer.

In the third stage (t4-t5 time period), after the current of secondary winding Ls has decreased to 0 A, since power switch M1 has not been turned on, the primary winding Lp, power switch M1, and circuit parasitic capacitance of the line may resonate. As a result, auxiliary voltage sampling signal Vsen may fluctuate about zero, and amplitude of fluctuation decreases gradually until power switch M1 is turned on again.

Thus, control signal generating circuit 2 can regulate the duty ratio and/or switching frequency of power switch M1, such that the output current and output voltage of the switch-mode converter satisfy the selected current parameters and voltage parameters. In particular embodiments, overcurrent protection circuit 1 can detect whether the switch-mode converter has overcurrent, and output overcurrent protection triggering signal Sovp is an active signal upon detection of overcurrent, such that the control signal generating circuit 2 may not output switch control signal Gm, or may output control signal Gm to control power switch M1 to be turned off.

Figure 5:
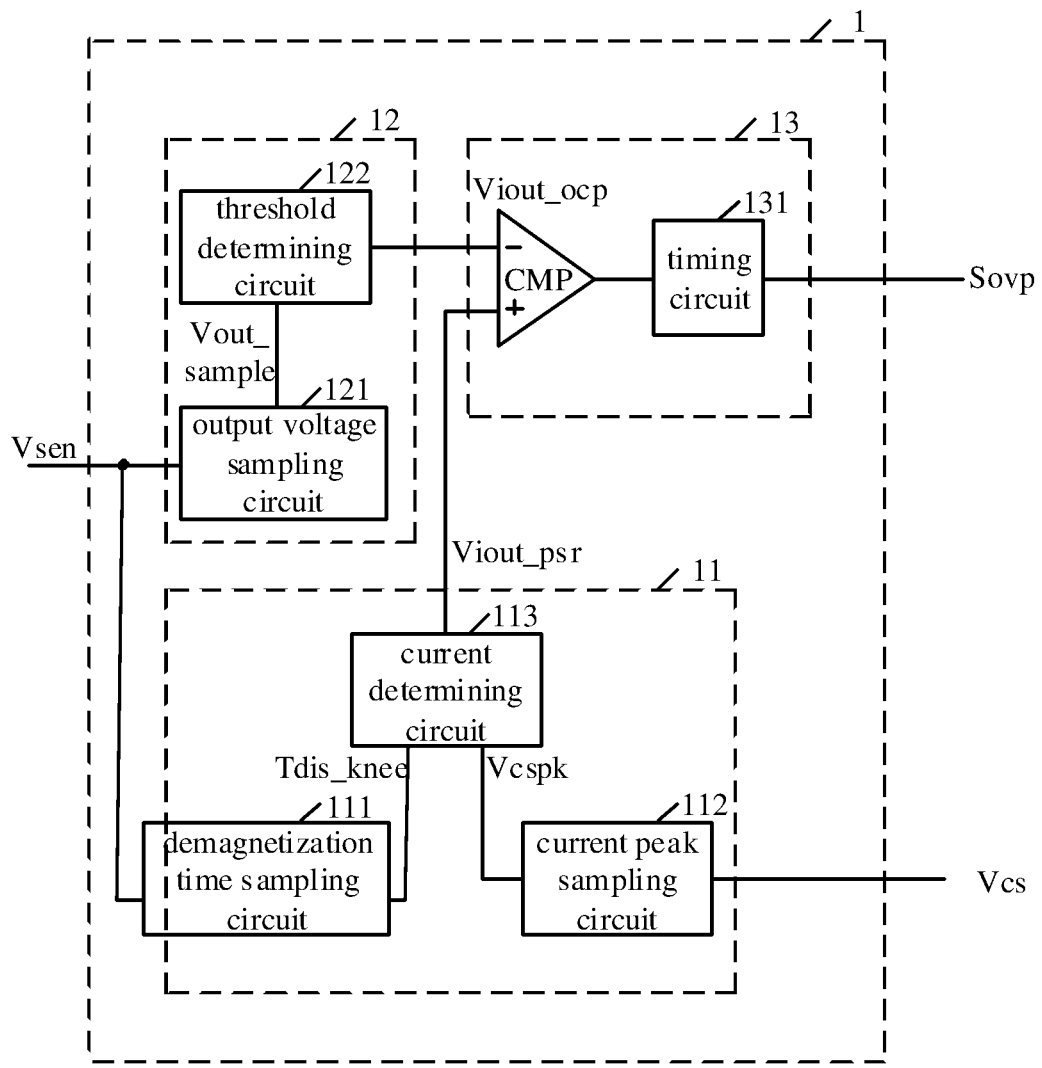
FIG. 5 is a schematic block diagram of an overcurrent protection circuit, in accordance with embodiments of the present invention.

Referring now to FIG. 5, shown is a schematic block diagram of an overcurrent protection circuit in accordance with embodiments of the present invention. In this particular example, overcurrent protection circuit 1 can include output current detection circuit 11, reference threshold generating circuit 12, and triggering signal generating circuit 13. Output current detection circuit 11 can determine an output current sampling signal Viout_psr of the switch-mode converter according to a primary current sampling signal Vcs and auxiliary voltage sampling signal Vsen. Reference threshold generating circuit 12 can obtain overcurrent reference threshold Viout_ocp according to an output voltage sampling signal and a predetermined overcurrent protection curve. The overcurrent protection curve can be indicative of the relationship between the output voltage and the overcurrent reference threshold. Triggering signal generating circuit 13 can generate an overcurrent protection triggering signal Sovp in response to output current sampling signal Viout_psr and the overcurrent reference threshold Viout_ocp meeting predetermined criteria, thereby triggering the switch-mode converter to enter a protection state.

In particular embodiments, output current detection circuit 11 can include demagnetization time sampling circuit 111, current peak sampling circuit 112, and current determining circuit 113. Demagnetization time sampling circuit 111 can obtain demagnetization time sampling signal Tdis_kee according to auxiliary voltage sampling signal Vsen. Demagnetization time sampling signal Tdis_kee can indicate that a transformer of the switch-mode converter is operating in a demagnetization duration. Current peak sampling circuit 112 can obtain a current peak sampling signal Vcspk according to primary current sampling signal Vcs. Current determining circuit 113 can determine output current sampling signal Viout_psr according to demagnetization time sampling signal Tdis_kee and current peak sampling signal Vcspk.

Demagnetization time sampling circuit 111 can connect to the auxiliary voltage sampling circuit, may receive auxiliary voltage sampling signal Vsen, and obtain demagnetization time sampling signal Tdis_kee according to auxiliary voltage sampling signal Vsen. Demagnetization time sampling signal Tdis_kee can indicate that a transformer of the switch-mode converter is operating in a demagnetization duration. Therefore, in FIGS. 4 and 5, demagnetization time sampling signal Tdis_kee exists during the t3-t4 time period.

Current peak sampling circuit 112 can connect to the primary current sampling circuit, may receive primary current sampling signal Vcs, and obtain current peak sampling signal Vcspk according to primary current sampling signal Vcs. Current peak sampling circuit 112 may determine the peak of primary current sampling signal Vcs and maintains the peak of primary current sampling signal Vcs to output current peak sampling signal Vcspk.

Thus, the peak of secondary current Is can be inferred according to primary current sampling signal Vcs. Therefore, output current Iout can be calculated with demagnetization time Tdis of the transformer. Thus, current determining circuit 113 can connecs to the output ends of the demagnetization time sampling circuit 111 and current peak sampling circuit 112, may receive demagnetization time sampling signal Tdis_knee and current peak sampling signal Vcspk, and determine output current sampling signal Viout_psr according to demagnetization time sampling signal Tdis_ knee and current peak sampling signal Vcspk.

Referring now to FIG. 6, shown is a schematic block diagram of a current determining circuit in accordance with embodiments of the present invention. In this particular example, current determining circuit 113 can include input end B1, output end B2, switch SW2, switch SW3, filter circuit, and a logic circuit. The logic circuit can control switches SW2 and SW3 to be turned on or turned off according to the control signal PWM of power switch M1 and demagnetization time sampling signal Tdis_kee indicative of the demagnetization duration of the transformer, such that output current sampling signal Viout_psr output from output end B2 is equal to or approximates to the secondary output current within one switching cycle.

Within one switching cycle, switch SW2 can be controlled to be turned on during the demagnetization duration while switch SW3 is turned off, such that an input end (e.g., a voltage at point E) of a filter circuit is current peak sampling signal Vcspk. Upon termination of demagnetization duration of the transformer, switch SW2 can be controlled to be turned off, and switch SW3 can be controlled to be turned on, such that the input end (e.g., the voltage at point E) of the filter circuit is zero.

In particular embodiments, the filter circuit can include two-stage RC filters. The first-order RC filter can include resistor R9 and capacitor C6 series-connected between the input end of the filter circuit and a reference ground. The second-order RC filter can include resistor R10 and capacitor C7 series-connected between a common point of resistor R9 and capacitor C6 and the reference ground, and the non-ground end of capacitor C7 is the output end B2.

In particular embodiments, the logic circuit is a RS trigger. A set end S of the RS trigger receives an inverter signal PWMB of control signal PWM. A reset end R of the RS trigger receives demagnetization time sampling signal Tdis_knee. The two output ends of the RS trigger are denoted with "Q" and "Q," respectively. In t3-t6 time period in FIG. 4, at time t3, signal PWMB switches from low level to high level, the RS trigger is set, the output signal of the output end Q can be at high level, and the output signal of the output end Q' can be at low level. At this point, switch SW2 is turned on, and switch SW3 is turned off, point E can receive the current peak sampling signal Vcspk. At time t4, secondary current Is decreases to 0 A and indicates that the demagnetization duration of the transformer ends, thus the RS trigger can be reset, the output signal of the output end Q can be at low level, and the output signal of the output end Q' can be at high level. Here, switch SW2 can be turned off, and switch SW3 turned on, and point E can receive zero voltage until time t6, i.e., the termination of one switching cycle. Thus, output current sampling signal Viout_psr is expressed by the equation below.

$$\text{Viout\_psr} = Vcspk * \frac{Tdis}{Tsw}$$

Here, Tdis denotes the demagnetization time (e.g., time period t3-t4 in FIG. 2) of the transformer, and Tsw denotes the switching cycle (e.g., time period t0-t3 or time period t3-t6) of the switch-mode converter. The secondary output current Iout is expressed by the equation below.

$$Iout = \frac{1}{2} * \frac{Vcspk}{R4} * \frac{Np}{Ns} * \frac{Tdis}{Tsw}$$

Therefore, the relationship between output current sampling signal Viout_psr and Iout is expressed by the equation below.

$$\text{Viout\_psr} = 2 * R4 * Iout * \frac{Ns}{Np}$$

The above equation shows that output current sampling signal Viout_psr is directly proportional to the output current Iout. Therefore, output current sampling signal Viout_psr is indicative of a secondary output current Tout. In particular embodiments, reference threshold generating circuit 12 can include output voltage sampling circuit 121 and threshold determining circuit 122. In particular embodiments, output voltage sampling circuit 121 can obtain output voltage sampling signal Vout_sample. In particular embodiments, output voltage sampling circuit 121 can sample the output voltage of the switch-mode converter to obtain output voltage sampling signal Vout_sample.

In another example, output voltage sampling circuit 121 may determine output voltage sampling signal Vout_sample according to auxiliary voltage sampling signal Vsen. Output voltage sampling signal Vout_sample is indicative of output voltage Vout. Threshold determining circuit 122 can determine the overcurrent reference threshold according to output voltage sampling signal Vout_sample and the overcurrent protection curve.

Output voltage sampling circuit 121 can determine output voltage sampling signal Vout_sample according to auxiliary voltage sampling signal Vsen within the demagnetization duration (e.g., within time period of demagnetization time Tdis). The relationship between auxiliary voltage sampling signal Vsen and output voltage Vout is expressed by the equation below.

$$Vsen = \frac{R3}{R2 + R3} * \frac{Na}{Ns} * Vout$$

Here, Vsen denotes the auxiliary voltage sampling signal, Vout denotes the output voltage of the secondary winding, Na denotes the number of turns of auxiliary winding La, and Ns denotes the number of turns of secondary winding Ls. Thus, output voltage sampling circuit 121 can determine output voltage sampling signal Vout_sample with the above equation according to auxiliary voltage sampling signal Vsen. For example, output voltage sampling signal Vout_sample is equal to output voltage Vout or is in a predetermined proportion to Vout. Threshold determining circuit 122 may determine the overcurrent reference threshold according to output voltage sampling signal Vout_sample and the overcurrent protection curve.

Referring now to FIG. 7, shown is a schematic view of an overcurrent protection curve in accordance with embodiments of the present invention. In this particular example, the horizontal axis represents output voltage Vout, and the vertical axis represents the overcurrent reference threshold Viout_ocp. The overcurrent reference threshold Viout_ocp is indicative of the output current Iout. When the output voltage is less than threshold Vout1, that is, Vout<Vout1, overcurrent reference threshold Viout_ocp is equal to reference threshold Vref1. When the output voltage is not less than threshold Vout1 and not greater than thresholdVout2, that is, Vout1≤Vout≤Vout2, overcurrent reference threshold Viout_ocp varies with output voltage Vout. The overcurrent reference threshold can be expressed by the equation below.

Viout_ocp=$K$*Vout, where $K$=−(Vref1−Vref2)/(Vout1−Vout2).

When Vout>Vout2, overcurrent reference threshold Viout_ocp is equal to reference thresholdVref2. Thus, the overcurrent reference threshold is determined according to the output voltage sampling signal. The overcurrent protection curve shown in FIG. 7 is only one example, and any other types of curves, such as segment-style overcurrent protection curve and curve-style overcurrent protection curve, are applicable in certain embodiments.

Referring now to FIG. 8, shown is a schematic view of another example overcurrent protection curve, in accordance with embodiments of the present invention. In this particular example, the horizontal axis represents output voltage Vout, and the vertical axis represents the signal overcurrent reference threshold Viout_ocp. The overcurrent reference threshold Viout_ocp is indicative of the output current Iout.

When Vout<Vout1, overcurrent reference threshold Viout_ocp=Vref1. When Vout1≤Vout≤Vout2, overcurrent reference threshold Viout_cop varies with Vout. The overcurrent reference threshold is expressed by the equation below.

Viout_ocp=$K1$*Vout, where $K1$=−(Vref1−Vref2)/(Vout1−Vout2).

When Vout2≤Vout≤Vout3, overcurrent reference threshold Viout_ocp=Vref2. When Vout3≤Vout≤Vout4, overcurrent reference threshold Viout_cop varies with Vout. In particular embodiments, overcurrent reference threshold is expressed by the equation below.

Viout_ocp=$K2$*Vout, where $K2$=−(Vref2−Vref3)/(Vout3−Vout4).

When Vout>Vout4, overcurrent reference threshold Viout_ocp=Vref3.

Figure 9:
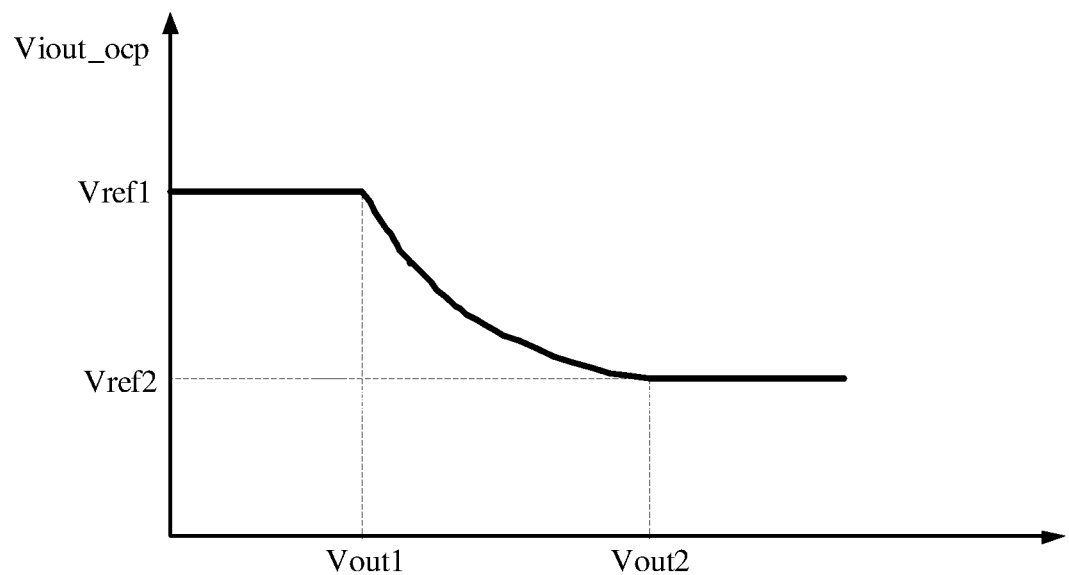
FIG. 9 is a schematic view of yet another example overcurrent protection curve, in accordance with embodiments of the present invention.

Referring now to FIG. 9, shown is a schematic view of yet another example overcurrent protection curve, in accordance with embodiments of the present invention. In this particular example, the horizontal axis represents output voltage Vout, and the vertical axis represents signal Viout_ocp. The signal Viout_ocp is indicative of the output current Iout. When Vout<Vout1, overcurrent reference threshold Viout_ocp=Vref1. When Vout>Vout2, overcurrent reference threshold Viout_ocp=Vref2. When Vout1≤Vout≤Vout2, overcurrent reference threshold Viout_cop varies with output voltage Vout, as shown.

In particular embodiments, the reference threshold generating circuit 12 can be implemented by a processor and a memory. The memory stores one or more computer program instructions. The computer instructions can be about curves of relationship of output voltage Vout and overcurrent reference threshold Viout_ocp. The one or more computer program instructions can be executed by the processor to obtain the overcurrent reference threshold Viout_ocp corresponding to output voltage Vout. In another optional embodiment, reference threshold generating circuit 12 is implemented by a circuit. The optional embodiment is exemplified by the overcurrent protection curve shown in FIG. 7.

Figure 10:
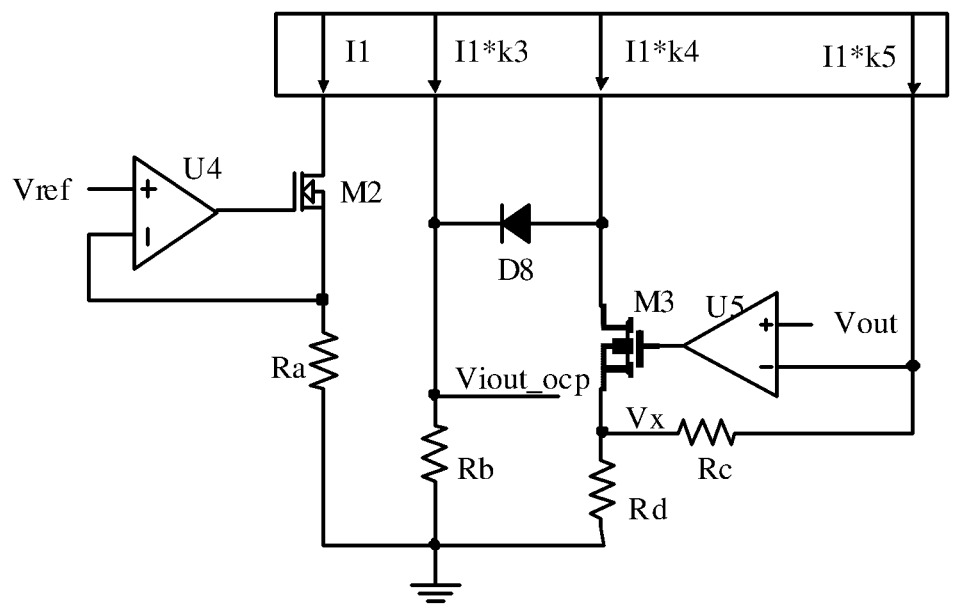
FIG. 10 is a schematic block diagram of a reference threshold generating circuit, in accordance with embodiments of the present invention.

Referring now to FIG. 10, shown is a schematic block diagram of a reference threshold generating circuit in accordance with embodiments of the present invention. In this particular example, I1, I1*k3, I1*k4 and I1*k5 denote current levels of different current sources generated, respectively. The input signals of the reference threshold generating circuit are reference voltage Vref and output voltage Vout, where Vref denotes reference voltage, and Vout denotes output voltage. The output signal of the reference threshold generating circuit is Viout_ocp. Here, output signal Viout_ocp of the reference threshold generating circuit is expressed by the equation below.

Viout_ocp=Rb*[$I1$*$k3$+$I1$*$k4$−$I(M3)$]

Here, I(M3) denotes the current flowing through switch M3 and is expressed by the equation below.

$I(M3)$=$I(Rd)$−$I(Rc)$

Here, I(Rd)=Vx/Rd, I(Rc)=I1*k5

According to the virtual ground concept in operational amplifier U5, the voltage at the non-inverting input terminal is equal to the voltage at the inverting input terminal, and thus Vout=Vx+I1*k5*Rc. The results are as follows:

$$I(M3) = \frac{Vout - I1 * k5 * (Rc + Rd)}{Rd}$$

and $$\text{Viout\_ocp} = Rb * \left( I1 * k3 + I1 * k4 - \frac{Vout - I1 * k5 * (Rc + Rd)}{Rd} \right)$$

where I1=Vref/Ra

Vref1 and Vref2 in FIG. 7 are substituted into the above equations to obtain the equations below.

Rb*$I1$*$k3$=Vref2, and Rb*($I1$*$k3$+$I1$*$k4$)=Vref1

Thus, when output voltage Vout is high and greater than Vout2, I(M3)>(I1*k4), the current in diode D8 is 0 A,Viout_ocp=Rb*I1*k3. Even if output voltage Vout is much higher, overcurrent reference threshold V iout_ocp will remain unaffected. Therefore, Viout_ocp=Rb*I1*k3=Vref2. When output voltage Vout is low and less than Vout1, I(M3) current is 0 A, where Viout_ocp=Rb*(I1*k3+I1*k4)=Vref1. Even if output voltage Vout is much lower, the overcurrent reference threshold Viout_ocp will remain unchanged. When Vout1<Vout<Vout2, overcurrent reference threshold Viout_ocp is expressed by the equation below.

$$\text{Viout\_ocp} = Rb * \left( I1 * k3 + I1 * k4 - \frac{Vout - I1 * k5 * (Rc + Rd)}{Rd} \right)$$

Since Rb, I1, k3, I1, k4, k5, Rc, Rd are fixed values, and thus the above equation can be simplified to become the equation below.

Viout_ocp=$K6$−$K7$*Vout

Here, K6, K7 are constants.

Thus, overcurrent reference threshold Viout_ocp of different levels can be output according to different voltage levels of output voltage Vout, respectively. Therefore, a precise overcurrent reference threshold can be provided, regardless of variations of the input voltage or output voltage. The overcurrent protection curve is provided according to LPS or provided as needed. For example, provision of the overcurrent protection curve according to LPS is based on the presumption that the PD power source has an output power of 65W, with LPS requirements specifying an output voltage of 3V~21V and a maximum output current of 8 A.

Figure 11:
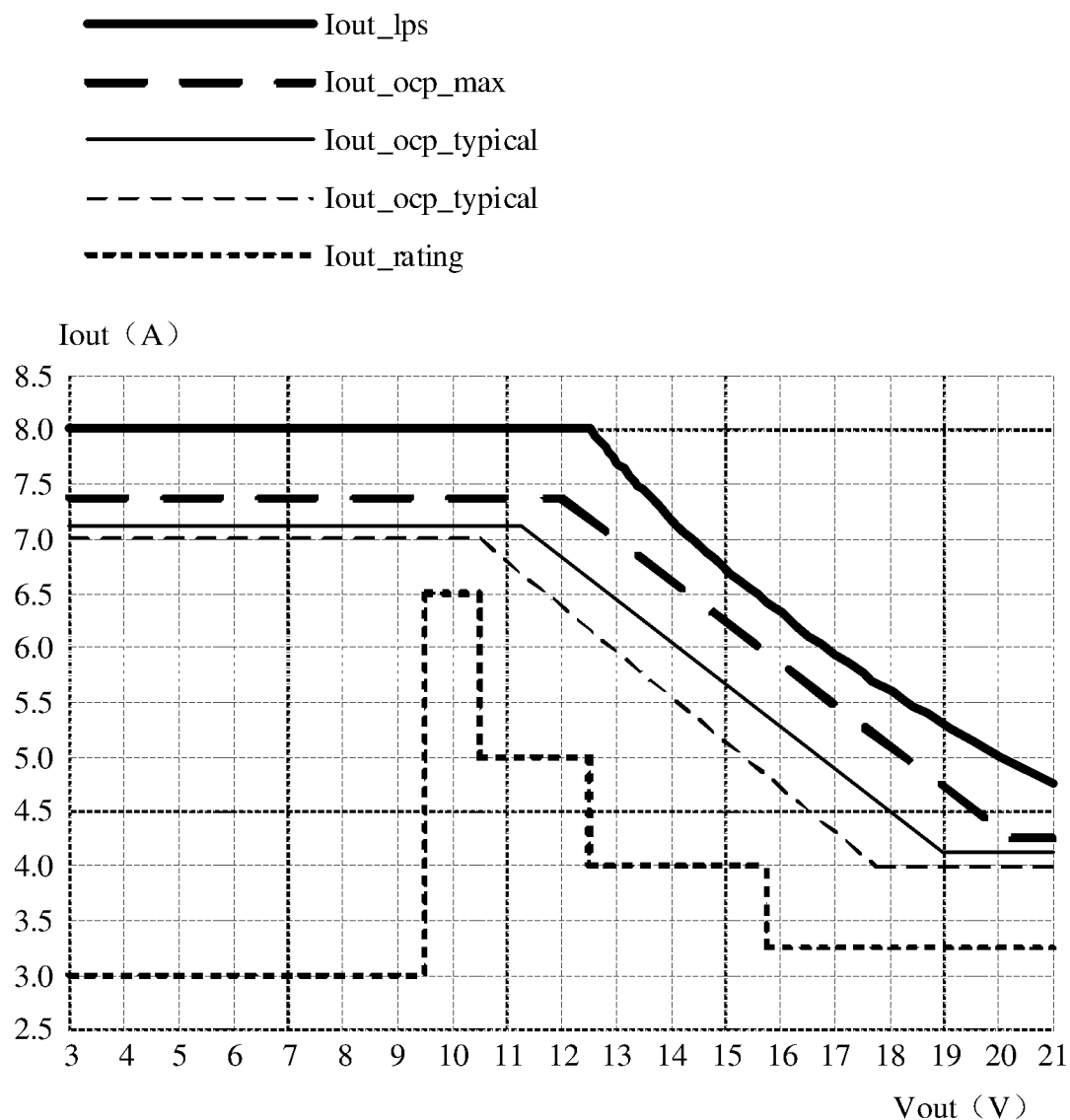
FIG. 11 is a schematic view of an LPS curve, in accordance with embodiments of the present invention.

Referring now to FIG. 11, the corresponding curves are shown. This particular example shows the respective curves for an LPS limited current Iout_lps, maximum value of overcurrent reference threshold Iout_ocp_max, standard value of overcurrent reference threshold Iout_ocp_typical, minimum value of overcurrent reference threshold Iout_ocp_min, output rated current Iout_rating, and output voltage Vout, respectively.

The uppermost curve relates to the LPS limited current Iout_lps and is a curve of limited current Iout_lps versus output voltage Vout. The bottom curve relates to the output rated current Iout_rating and is a curve of output rated current Iout_rating versus output voltage Vout. The three middle curves relate to an overcurrent reference threshold. Considering the deviation of mass production, the three curves relate to the maximum value of the overcurrent reference threshold Iout_ocp_max, standard value of the overcurrent reference threshold Iout_ocp_typical and minimum value of the overcurrent reference threshold Iout_ocp_min, respectively. In particular embodiments, the overcurrent protection curve relates to maximum value of the overcurrent reference threshold Iout_ocp_max.

Referring back to FIG. 5, triggering signal generating circuit 13 can output the overcurrent protection triggering signal in response to that the output current sampling signal and the overcurrent reference threshold meet a predetermined criterion. Triggering signal generating circuit 13 can include a comparison circuit (e.g., a comparator CMP). The non-inverting input terminal of comparator CMP receives output current sampling signal Viout_psr. The inverting input terminal of comparator CMP receives the overcurrent reference threshold Viout_ocp. Comparator CMP can output a comparison result of output current sampling signal Viout_psr and overcurrent reference threshold Viout_ocp. Triggering signal generating circuit 13 can trigger overcurrent protection in response to the comparison result that the output current sampling signal is greater than the overcurrent reference threshold. To avoid wrong triggering, triggering signal generating circuit 13 can also include timing circuit 131 that outputs the overcurrent protection triggering signal in response to the comparison result that the output current sampling signal remains is greater than the overcurrent reference threshold for a predetermined period of time.

When output current sampling signal Viout_psr is greater than the overcurrent reference threshold Viout_ocp, comparator CMP outputs a high level. When output current sampling signal Viout_psr is less than the overcurrent reference threshold Viout_ocp, comparator CMP can output a low level. When timing circuit 131 can receive a high level, timing begins. When timing satisfies a predetermined duration, overcurrent protection triggering signal Sovp can be output/activated.

Timing circuit 131 can start timing when receiving a high level, and output overcurrent protection trigger signal Sovp when the timing meets the predetermined period of time. Further, timing circuit 131 can start timing when a high level is received, and end timing when a low level is received. Thus, when the duration in which output current sampling signal Viout_psr is continuously greater than the overcurrent reference threshold Viout_ocp exceeds a predetermined duration, the overcurrent protection triggering signal Sovp is output. Thus, timing circuit 131 can prevent erroneous triggering which might result from interference to output current Tout caused by various noise, such as electro-static discharge (ESD) of the circuit and pulse group "s."

In particular embodiments, control signal generating circuit 2 can control the switch-mode converter to enter a protection state according to overcurrent protection triggering signal Sovp. When control signal generating circuit 2 has not received the overcurrent protection triggering signal Sovp, the switch control signal can be generated to control the power switch to be turned on or turned off, thereby controlling the output voltage and/or output current of the switch-mode converter to meet a predetermined criterion. When control signal generating circuit 2 receives overcurrent protection triggering signal Sovp, the power switch can be turned off, thereby triggering the switch-mode converter to enter a protection state The above example is exemplified by calculating an output voltage sampling signal according to an auxiliary voltage sampling signal. In another example, the output voltage of the switch-mode converter is directly sampled. The above example also shows calculating an output current sampling signal according to a peak current sampling signal and a demagnetization time sampling signal. In another example, the output current of the switch-mode converter is directly sampled. In the above example, the switch-mode converter is an isolated switch-mode converter, but the control circuit is applicable to various switch-mode converters.

In particular embodiments, an overcurrent reference threshold is determined according to an output voltage sampling signal and a predetermined overcurrent protection curve. When an output current sampling signal and the overcurrent reference threshold meet a predetermined criterion, an overcurrent protection triggering signal can be generated, thereby triggering the switch-mode converter to enter a protection state. Thus, the overcurrent protection is provided for the switch-mode converter to reduce safety risks on the condition that LPS requirements are met.

Figure 12:
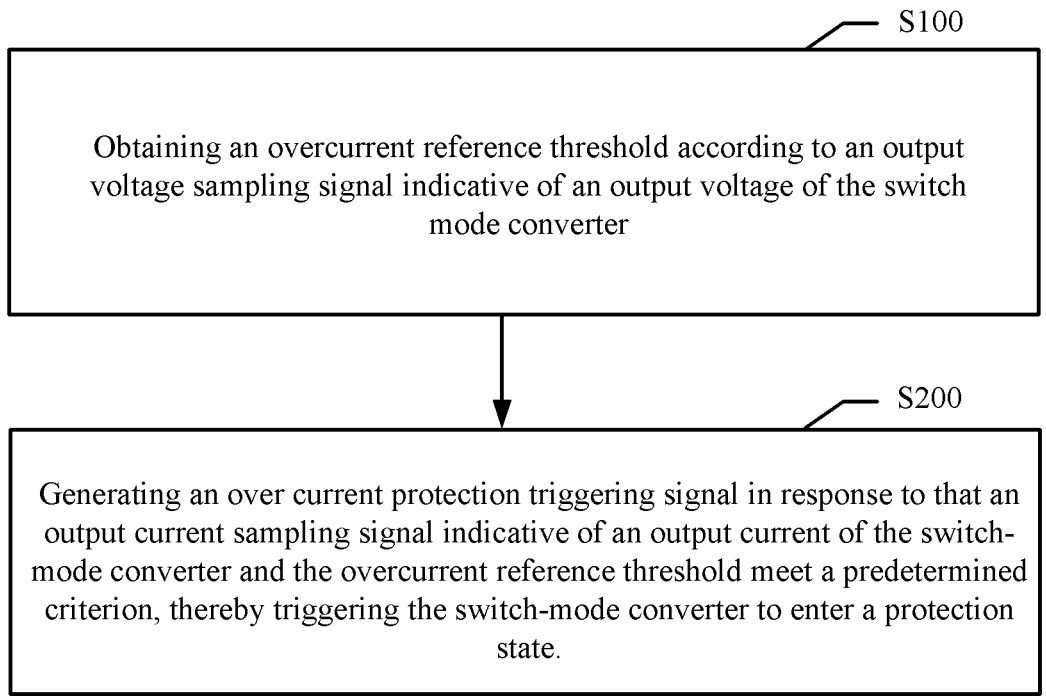
FIG. 12 is a schematic view of a process flow of a control method, in accordance with embodiments of the present invention.

Referring now to FIG. 12, shown is a schematic view of a process flow of a control method in accordance with embodiments of the present invention. In this particular example, the control method can include the following. At S100, an overcurrent reference threshold can be obtained according to an output voltage sampling signal indicative of an output voltage of the switch-mode converter and a predetermined overcurrent protection curve, the overcurrent protection curve being indicative of a relationship between the output voltage of the switch-mode converter and the overcurrent reference threshold. Also, at S200, an overcurrent protection triggering signal can be generated in response to that the output current sampling signal indicative of the output current of the switch-mode converter and the overcurrent reference threshold meet a predetermined criterion, thereby triggering the switch-mode converter to enter a protection state.

In some embodiments, the overcurrent protection triggering signal controls the power switch of the switch-mode converter to be turned off, thereby triggering the switch-mode converter to enter a protection state. In some embodiments, the control method can also include generating a switch control signal in response to not generating the overcurrent protection triggering signal, in order to control the power switch of the switch-mode converter to be turned on or turned off, thereby controlling the output voltage and/or output current of the switch-mode converter to meet predetermined needs. In some embodiments, the output voltage sampling signal is obtained by sampling the output voltage of the switch-mode converter, and the output current sampling signal is obtained by sampling the output current of the switch-mode converter.

In some embodiments, when the switch-mode converter is configured as an isolated switch-mode converter, the output voltage sampling signal is determined according to an auxiliary voltage sampling signal. The auxiliary voltage sampling signal can be obtained by sampling the voltage across the two ends of an auxiliary winding coupled to a primary winding of the transformer in the isolated switch-mode converter. In some embodiments, the output current sampling signal is obtained by: obtaining a demagnetization time sampling signal according to the auxiliary voltage sampling signal, the demagnetization time sampling signal indicating that the transformer is in a demagnetization duration; and determining the output current sampling signal according to the demagnetization time sampling signal and a primary current peak sampling signal. In some embodiments, the predetermined criterion is that the output current sampling signal is greater than the overcurrent reference threshold for a predetermined period of time.

In some embodiments, the step of determining the output current sampling signal according to the demagnetization time sampling signal and the primary current peak sampling signal can include: keeping an input signal of the filter circuit of the current determining circuit within the demagnetization duration of the transformer in one switching cycle as the primary current peak sampling signal; controlling the input signal of the filter circuit of the current determining circuit to be zero when an end of the demagnetization duration is detected; and generating the output current sampling signal through the filter circuit of the current determining circuit.

In particular embodiments, an overcurrent reference threshold is determined according to an output voltage sampling signal and a predetermined overcurrent protection curve. When an output current sampling signal and an overcurrent reference threshold meet a predetermined criterion, an overcurrent protection triggering signal is generated, thereby triggering the switch-mode converter to enter a protection state. Thus, the overcurrent protection is provided for the switch-mode converter to reduce safety risks on the condition that LPS requirements are met.

An embodiment of the disclosure further provides an integrated circuit, applicable to a switch-mode converter. The integrated circuit can include: an overcurrent protection circuit configured to obtain an overcurrent reference threshold according to an output voltage sampling signal indicative of an output voltage of the switch-mode converter and a predetermined overcurrent protection curve, and generate an overcurrent protection triggering signal in response to that an output current sampling signal indicative of an output current of the switch-mode converter and the overcurrent reference threshold meet a predetermined criterion, where the overcurrent protection curve is indicative of a relationship between an output voltage of the switch-mode converter and the overcurrent reference threshold; and a control signal generating circuit configured to control the switch-mode converter to enter a protection state in response to receiving the overcurrent protection triggering signal.

In some embodiments, the control signal generating circuit can generate a switch control signal in response to not receiving the overcurrent protection triggering signal, in order to control the power switch of the switch-mode converter to be turned on or turned off, thereby controlling an output voltage and/or output current of the switch-mode converter to meet predetermined needs.

In some embodiments, the overcurrent protection circuit can include: a reference threshold generating circuit configured to obtain an overcurrent reference threshold according to an output voltage sampling signal indicative of an output voltage of the switch-mode converter and a predetermined overcurrent protection curve; and a triggering signal generating circuit configured to generate an overcurrent protection triggering signal in response to that an output current sampling signal indicative of an output current of the switch-mode converter and the overcurrent reference threshold meet a predetermined criterion.

In some embodiments, the output voltage sampling signal is obtained by sampling an output voltage of the switch-mode converter, and the output current sampling signal is obtained by sampling an output current of the switch-mode converter. In some embodiments, when the switch-mode converter is configured as an isolated switch-mode converter, the reference threshold generating circuit can include: an output voltage sampling circuit configured to obtain an output voltage sampling signal according to an auxiliary voltage sampling signal, wherein the auxiliary voltage sampling signal is obtained by sampling the voltage across the two ends of an auxiliary winding coupled to a primary winding of the transformer in the isolated switch-mode converter; and a threshold determining circuit configured to determine the overcurrent reference threshold according to the output voltage sampling signal and the overcurrent protection curve.

In some embodiments, the overcurrent protection circuit can also include an output current detection circuit configured to obtain an output current sampling signal according to the auxiliary voltage sampling signal and a primary current sampling signal, the primary current sampling signal being indicative of a current flowing through the primary winding.

In some embodiments, the output current detection circuit can include: a demagnetization time sampling circuit configured to obtain a demagnetization time sampling signal according to an auxiliary voltage sampling signal, the demagnetization time sampling signal indicating that the transformer of the switch-mode converter is in a demagnetization duration; a current peak sampling circuit configured to obtain a current peak sampling signal according to the primary current sampling signal; and a current determining circuit configured to determine the output current sampling signal according to the demagnetization time sampling signal and the current peak sampling signal.

In some embodiments, the predetermined criterion is that the output current sampling signal is greater than the overcurrent reference threshold when an end of the demagnetization duration is detected. In some embodiments, the triggering signal generating circuit can include: a comparison circuit configured to obtain a comparison result of the output current sampling signal and the overcurrent reference threshold; and a timing circuit configured to output the overcurrent protection triggering signal in response to the comparison result that the output current sampling signal is greater than the overcurrent reference threshold when an end of the demagnetization duration is detected.

In some embodiments, the current determining circuit can include: a first input end configured to receive the current peak sampling signal; a first output end configured to output the output current sampling signal; a first switch; a filter circuit, where the filter circuit and the first switch are series-connected between the first input end and the first output end, the filter circuit comprising at least one capacitor; a second switch, where the second switch and the first switch are series-connected between the first input end and a ground end; and a logic circuit configured to control the first switch to be turned on and the second switch to be turned off within the transformer demagnetization duration in one duty cycle to keep an input signal of the filter circuit as the primary current peak sampling signal, and control the input signal of the filter circuit of the current determining circuit to be zero upon detection of completion of the demagnetization duration, such that the filter circuit outputs the output current sampling signal.

In particular embodiments, an overcurrent reference threshold is determined according to an output voltage sampling signal and a predetermined overcurrent protection curve, and an overcurrent protection triggering signal is generated when an output current sampling signal and the overcurrent reference threshold meet a predetermined criterion, thereby triggering the switch-mode converter to enter a protection state. Thus, overcurrent protection is provided for the switch-mode converter to reduce safety risks on the condition that LPS requirements are met.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of controlling a switch-mode converter, the method comprising:
   a) obtaining an overcurrent reference threshold according to an output voltage sampling signal that is indicative of an output voltage of the switch-mode converter, wherein the overcurrent reference threshold is configured to gradually decrease as the output voltage increases within a predetermined range of the output voltage; and
   b) generating an over current protection triggering signal in response to an output current sampling signal and the overcurrent reference threshold meeting a predetermined criterion, thereby triggering the switch-mode converter to enter a protection state, wherein the output current sampling signal is indicative of an output current of the switch-mode converter.

2. The method of claim 1, further comprising:
   a) controlling a power switch of the switch-mode converter to be turned off in response to generating an active overcurrent protection triggering signal, thereby triggering the switch-mode converter to enter the protection state; and
   b) in response to generating an inactive overcurrent protection triggering signal controlling the power switch to be turned on and turned off, thereby controlling an output voltage and/or output current of the switch-mode converter to meet predetermined needs.

3. The method of claim 1, wherein the output voltage sampling signal is obtained by sampling an output voltage of the switch-mode converter, and the output current sampling signal is obtained by sampling an output current of the switch-mode converter.

4. The method of claim 1, wherein the switch-mode converter is configured as an isolated switch-mode converter, the output voltage sampling signal is determined according to an auxiliary voltage sampling signal, and the auxiliary voltage sampling signal is obtained by sampling a voltage across two ends of an auxiliary winding coupled to a primary winding of a transformer in the isolated switch-mode converter.

5. The method of claim 4, wherein the output current sampling signal is obtained by:
   a) obtaining a demagnetization time according to the auxiliary voltage sampling signal of the transformer;
   b) obtaining a current peak sampling signal representing a peak value of a primary current flowing through the primary winding; and
   c) determining the output current sampling signal that is proportional to a product of the current peak sampling signal and the demagnetization time, and inversely proportional to a switching cycle.

6. The method of claim 5, wherein the step of determining the output current sampling signal according to the demagnetization time and the current peak sampling signal comprises:
   a) keeping an input signal of a filter circuit within the demagnetization time of the transformer in one switching cycle as the current peak sampling signal;
   b) controlling the input signal of the filter circuit to be zero when an end of the demagnetization time is detected; and
   c) generating the output current sampling signal at an output terminal of the filter circuit.

7. The method of claim 1, wherein the predetermined criterion is that the output current sampling signal is greater than the overcurrent reference threshold for a predetermined period of time.

8. A control circuit for a switch-mode converter, the control circuit comprising:
   a) an overcurrent protection circuit having a reference threshold generating circuit configured to generate an overcurrent reference threshold according to an output voltage sampling signal that is indicative of an output voltage of the switch-mode converter, and a triggering signal generating circuit configured to generate an overcurrent protection triggering signal in response to an output current sampling signal and the overcurrent reference threshold meeting a predetermined criterion, wherein the output current sampling signal is indicative of an output current of the switch-mode converter, and wherein the overcurrent reference threshold is configured to gradually decrease as the output voltage increases within a predetermined range of the output voltage; and
   b) a control signal generating circuit configured to control the switch-mode converter to enter a protection state in response to the overcurrent protection triggering signal.

9. The control circuit of claim 8, wherein the control signal generating circuit is further configured to control a power switch of the switch-mode converter to be turned on or turned off in response to receiving an inactive overcurrent protection triggering signal, thereby controlling an output voltage and/or output current of the switch-mode converter to meet predetermined needs; and control the power switch to be turned off in response to receiving an active overcurrent protection triggering signal.

10. The control circuit of claim 8, wherein the output voltage sampling signal is obtained by sampling an output voltage of the switch-mode converter, and the output current sampling signal is obtained by sampling an output current of the switch-mode converter.

11. The control circuit of claim 8, wherein the switch-mode converter is configured as an isolated switch-mode converter, and the reference threshold generating circuit comprises:
   a) an output voltage sampling circuit configured to obtain the output voltage sampling signal according to an auxiliary voltage sampling signal, the auxiliary voltage sampling signal being obtained by sampling a voltage across two ends of an auxiliary winding coupled to a primary winding of a transformer in the isolated switch-mode converter; and
   b) a threshold determining circuit configured to determine the overcurrent reference threshold according to the output voltage sampling signal and an overcurrent protection curve, the overcurrent protection curve being indicative of a relationship between the output voltage of the switch-mode converter and the overcurrent reference threshold.

12. The control circuit of claim 11, wherein the overcurrent protection circuit further comprises an output current detection circuit configured to obtain a demagnetization time, to obtain a current peak sampling signal representing a peak value of a primary current flowing through the primary winding, and to determine the output current sampling signal to be proportional to a product of the current peak sampling signal and the demagnetization time, and inversely proportional to a switching cycle.

13. The control circuit claim 12, wherein the output current detection circuit comprises:
   a) a demagnetization time sampling circuit configured to obtain a demagnetization time sampling signal according to the auxiliary voltage sampling signal, the demagnetization time sampling signal indicating that the transformer of the switch-mode converter is in a demagnetization duration;
   b) a current peak sampling circuit configured to obtain the current peak sampling signal according to a primary current sampling signal; and
   c) a current determining circuit configured to determine the output current sampling signal according to the demagnetization time sampling signal and the current peak sampling signal.

14. The control circuit of claim 13, wherein the current determining circuit comprises:
   a) a first input terminal configured to receive the current peak sampling signal;
   b) a first output terminal configured to output the output current sampling signal;
   c) a first switch;
   d) a filter circuit coupled in series with the first switch between the first input terminal and the first output terminal, and comprising at least one capacitor;
   e) a second switch coupled in series with the first switch between the first input terminal and a ground terminal; and
   f) a logic circuit configured to control the first switch to be turned on and the second switch to be turned off within the demagnetization duration of the transformer in one switching cycle so as to maintain an input signal of the filter circuit as the current peak sampling signal, and control the input signal of the filter circuit of the current determining circuit to be zero when an end of the demagnetization duration is detected, thereby triggering the filter circuit to output the output current sampling signal.

15. The control circuit of claim 14, wherein the logic circuit comprises an RS trigger, wherein the RS trigger has a set terminal for receiving a switch control signal and a reset terminal for receiving the demagnetization time sampling signal, in order to generate output signals to respectively control the first and second switches.

16. The control circuit of claim 8, wherein the predetermined criterion comprises the output current sampling signal being greater than the overcurrent reference threshold for a predetermined period of time.

17. The control circuit of claim 8, wherein the triggering signal generating circuit comprises:
   a) a comparison circuit configured to obtain a comparison result of the output current sampling signal and the overcurrent reference threshold; and
   b) a timing circuit configured to output the overcurrent protection triggering signal in response to the comparison result that the output current sampling signal is greater than the overcurrent reference threshold for a predetermined period of time.

18. A power converter, comprising the control circuit of claim 8, and a power stage circuit having at least one power switch connected in series with the primary winding.

* * * * *